United States Patent [19]

Yanagidate

[11] Patent Number: 5,268,891
[45] Date of Patent: Dec. 7, 1993

[54] OPTICAL RECORDING/REPRODUCING APPARATUS WHICH REDUCES SEEK TIME BY TIMING INITIATION OF TRACKING CONTROL BASED UPON CHARACTERISTICS OF RECORD MEDIUM VIBRATIONS RELATIVE TO AN OPTICAL PICK-UP HEAD

[75] Inventor: Masaharu Yanagidate, Sagamihara, Japan

[73] Assignee: Olympus Optical Co., Ltd., Tokyo, Japan

[21] Appl. No.: 704,174

[22] Filed: May 22, 1991

[30] Foreign Application Priority Data

May 24, 1990 [JP] Japan .................................. 2-134943
May 30, 1990 [JP] Japan .................................. 2-138514

[51] Int. Cl.⁵ ............................................ G11B 7/00
[52] U.S. Cl. ................................. 369/97; 369/44.28; 369/44.25; 369/44.29; 369/32
[58] Field of Search ............. 369/97, 96, 44.18, 44.25, 369/44.28, 44.29, 44.26, 32, 247, 44.32, 44.41; 360/77.03, 77.04; 363/747

[56] References Cited

U.S. PATENT DOCUMENTS 4,967,293 10/1990 Aruga et al. ......................... 369/247
5,038,333 8/1991 Chow et al. ...................... 369/44.28

Primary Examiner—Aristotelis Psitos
Assistant Examiner—Muhammad Edun
Attorney, Agent, or Firm—Stevens, Davis, Miller & Mosher

[57] ABSTRACT

An optical recording/reproducing apparatus effects a seek operation by moving an optical pick-up, which includes an objective lens for projecting a light spot onto an optical card, in a tracking direction perpendicular to the track direction over a desired distance between a current track on which the light spot is currently made incident and a desired track on which the light spot is to be made incident next. To reduce the access time during a seek operation, the vibration of the optical card is monitored and the tracking control is started substantially immediately when the light spot is just made incident upon the desired track. The tracking control may be initiated, e.g., at a timing which is separated from a peak of the vibration by ¼ of a period of the vibration. Alternatively, the tracking control may be started when the acceleration of the vibration becomes zero. The tracking control may be initiated virtually immediately after the movement of the pick-up is stopped, when the distance of the movement of the pick-up is corrected by a correction amount which is presumed in accordance with positions of the current track and the desired track.

12 Claims, 10 Drawing Sheets

FIG._3

43 Edge Detector

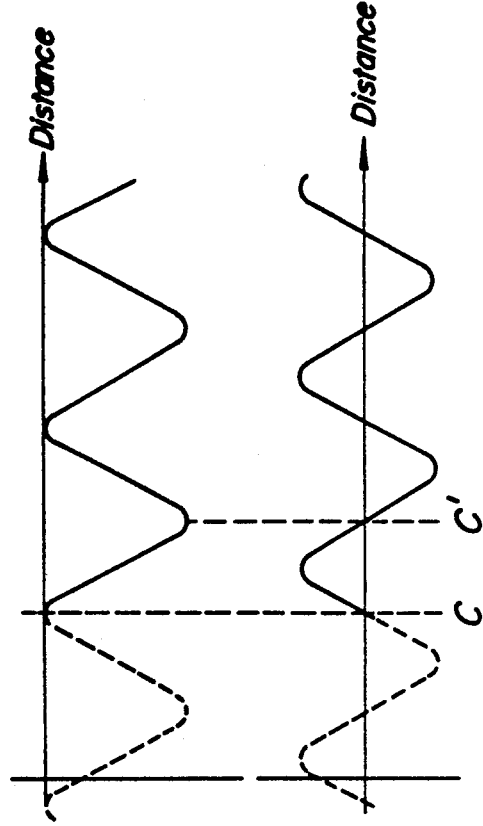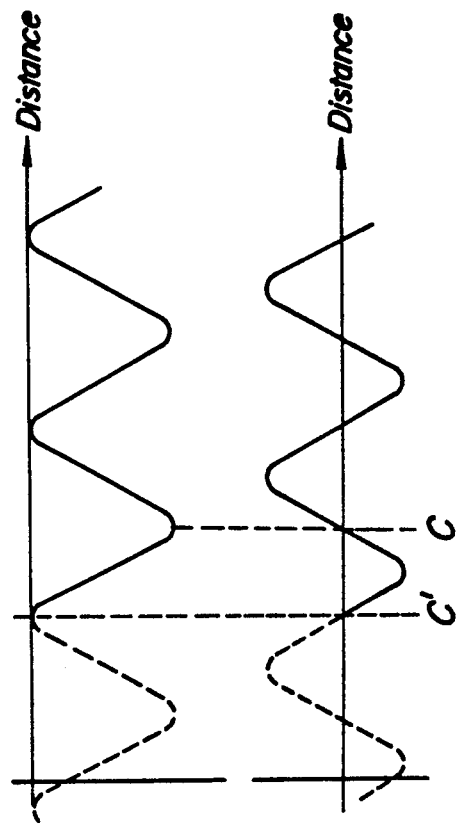

FIG_9

FIG. 11

| Desired Position | | | | | |
|---|---|---|---|---|---|
| 100H | 2 | 2 | | 0 | 0 |
| | 2 | 2 | | 0 | 0 |
| | | | | | |
| | 0 | 0 | | -2 | -1 |
| 0H | 0 | 0 | | -1 | -1 |
| | 0H | | | | 100H Current Position |

OPTICAL RECORDING/REPRODUCING APPARATUS WHICH REDUCES SEEK TIME BY TIMING INITIATION OF TRACKING CONTROL BASED UPON CHARACTERISTICS OF RECORD MEDIUM VIBRATIONS RELATIVE TO AN OPTICAL PICK-UP HEAD

BACKGROUND OF THE INVENTION

Field of the Invention and Related Art Statement

The present invention relates to an apparatus for recording and/or reproducing information on and/or from an optical record medium such as optical card, optical disc and opto-magnetic disc.

In a known recording and reproducing apparatus using an optical card, a so-called seek operation is carried out in the following manner. A distance between a track on which a reading or writing light spot is made incident and a track on which the light spot is to be made incident upon next is derived by reading an address of the former track and an address of the latter desired track. Then, a head carriage on which an optical pick-up for projecting the focused light beam onto the optical card is installed is moved in a direction substantially perpendicular to a track direction in which the tracks extend in accordance with the thus derived distance. An amount of the movement of the head carriage is detected with the aid of a scale and a position of the head carriage. After the head carriage has been moved over the desired distance, the head carriage is stopped and then the tracking operation is started to effect the track-on and an address recorded in the relevant track is read out. When the read out track address is identical with the address of the desired track, the seek operation is finished. In the optical card, the distance between tracks is rather high, so that the possibility that the light spot is made incident upon the desired track is rather high. However, sometimes the light spot is not made incident on the desired track. When the read out track address is not identical with that of the desired track, the light spot is then moved in forward or backward direction depending on a distance between the relevant track and the desired track. Usually this track jump is performed by moving an objective lens for projecting the light spot. After the light spot has been jumped over the desired number of tracks, an address of a track on which the light beam is made incident is read out and is compared with the address of the desired track. When these addresses are identical with each other, the seek operation is finished.

In Japanese Patent Publication No. 62-20611, there is described a known information recording and reproducing apparatus using an optical disc. In the optical disc, the distance between successive tracks is very small with respect to the pitch of the scale, and therefore the light spot could not be made incident upon the desired track only by moving the head carriage. In this known apparatus the seek operation is carried out by effecting a rough positioning of the optical head with respect to a desired track with the aid of the scale and then a fine positioning is performed by moving the light spot in accordance with a difference between the address of the desired track and a read out address of a track on which the light spot is made incident.

In the above mentioned known apparatus for recording and/or reproducing information on and/from the optical card, after the head carriage is moved toward the desired track and is stopped thereat on the basis of the scale, the tracking operation is initiated and the light spot is made incident upon the relevant track by means of a tracking control. However, the driving portion of the head carriage is not constructed completely separated from the record medium supporting portion, and therefore the record medium is vibrated with respect to the head carriage due to the repelling action of the movement of the head carriage. Therefore, when the tracking operation is initiated immediately after the movement of the head carriage is stopped, the tracking operation could not be effected precisely and the light beam might not be projected on the desired track. Then, it is necessary to effect the track jump in order to made incident the light spot on the desired track. In this manner, in the known apparatus the seek operation could not be performed within a short time and the access time becomes long.

SUMMARY OF THE INVENTION

The present invention has for its object to provide a novel and useful apparatus for recording and/or reproducing information on and/or from an optical record medium, in which the seek operation can be performed precisely within a short time period even if the optical record medium is vibrated with respect to the head carriage.

According to the invention, an apparatus for recording and/or reproducing information on and/or from an optical record medium comprises:

a pick-up means for projecting a light spot onto an optical record medium to record and/or reproduce information on and/or from the optical record medium, said information being recorded along a plurality of tracks;

a head carriage means for moving said pick-up means in a seek direction which is substantially perpendicular to a track direction in which said tracks are aligned;

a scanning means for moving the optical record medium with respect to the light spot in said track direction to effect the recording and/or reproducing;

a tracking means for positioning said light spot onto a track during the movement of the optical record medium with respect to the light spot in the track direction;

a seek means for effecting a seek operation by driving said head carriage such that said pick-up means is moved in the seek direction over a distance between a track on which the light spot is currently made incident and a desired track on which the light spot is to be made incident next; and a control means for initiating the tracking operation by said tracking means when said light spot is made incident just on said desired track after the pick-up means has been moved over said distance during the seek operation.

In the apparatus according to the invention, the tracking operation is initiated when the light spot is made incident upon the desired track during the seek operation, so that even if the optical record medium is vibrated at the end of the movement of the pick-up means during the seek operation, the correct track-on can be attained. That is to say, the light spot is not made incident upon a track other than the desired track, and therefore the access time can be shortened.

According to a preferred embodiment of the information recording and/or reproducing apparatus according to the invention, said control means is constructed such that peak points of the vibration of the optical record medium are detected and the tracking control is started at a middle point of successive peak points.

In another preferred embodiment of the information recording and/or reproducing apparatus according to the invention, the variation in the acceleration of the vibration of the optical record medium with respect to the pick-up means is detected and the tracking control is initiated when the acceleration becomes zero.

In still another preferred embodiment of the information recording and/or reproducing apparatus according to the invention, said control means comprises a memory for storing a displacement table which represents presumed displacement amounts of the optical record medium during the seek operation. A correction amount for the movement of the pick-up means is derived from the displacement table in accordance with a current track position and a desired track position, and the pick-up means is moved over a distance which is equal to the distance between the current track and the desired track plus or minus said correction amount. In this embodiment, at the end of the movement of the pick-up means, it can be estimated that the light spot is just made incident upon the desired track.

BRIEF DESCRIPTION OF THE DRAWINGS

FIGS. 6A to 6D are signal waveforms of the total light amount signal and tracking error signal;

FIG. 11 is a diagram showing a displacement table representing displacement amounts of the light spot with respect to the desired track during the seek operation.

DETAILED EXPLANATION OF THE PREFERRED EMBODIMENTS

Figure 1:
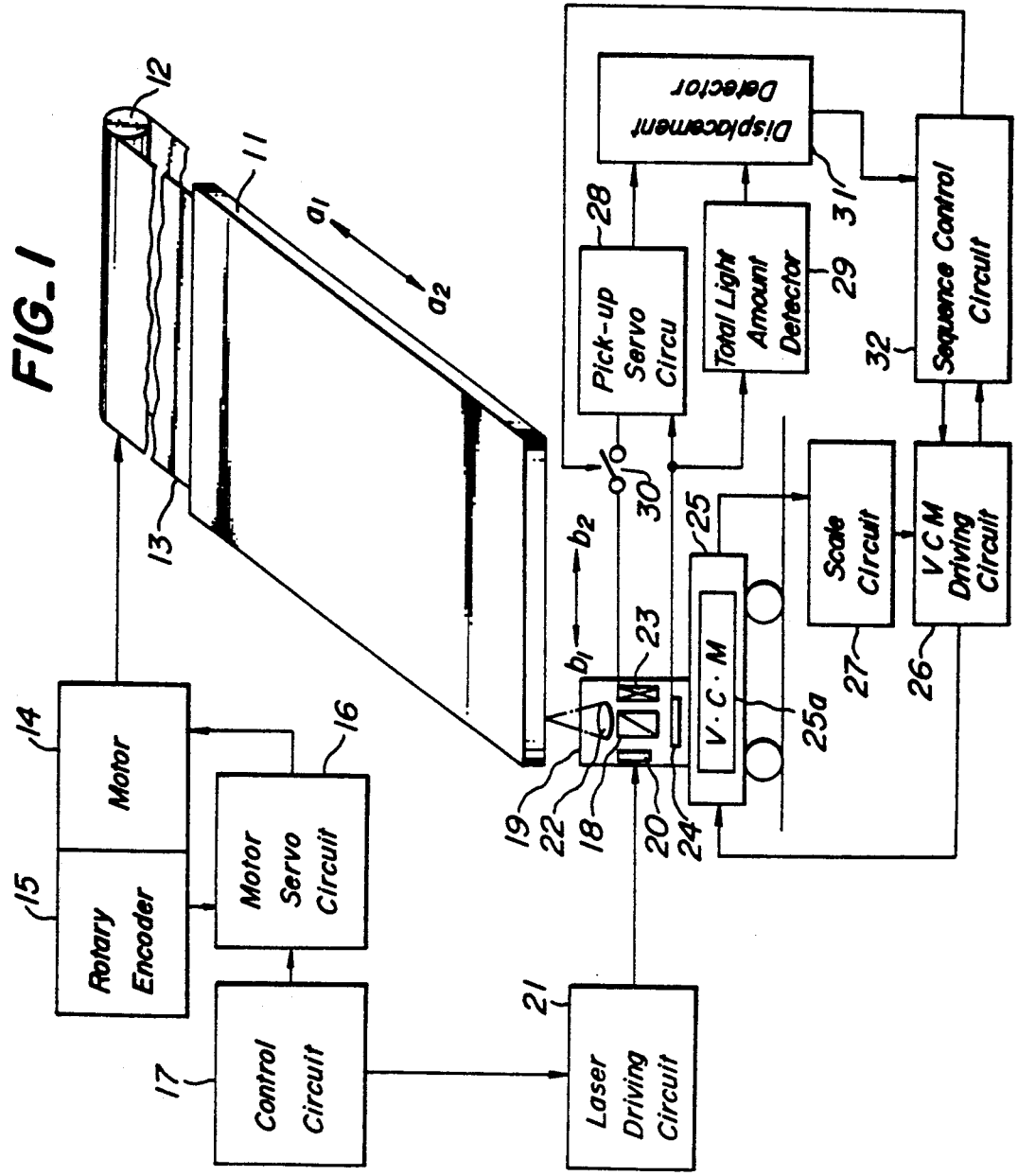
FIG. 1 is a black diagram showing the construction of an embodiment of the information recording and/or reproducing apparatus according to the invention.

FIG. 1 is a block diagram showing a first embodiment of the information recording and/or reproducing apparatus according to the invention. In the present embodiment, an optical card is used as the optical record medium and a number of tracks are arranged in parallel with each other in a track direction. An optical card 11 is placed on a shuttle not shown and is moved in a track direction $a_1$ or $a_2$ by means of a scanning means including a feeding belt 13 wound around a pulley 12 and a motor 14 for rotating the pulley 12. To the motor 14 is provided a rotary encoder 15 for detecting the position of the shuttle. An output signal of the rotary encoder 15 is supplied to a motor servo circuit 16 which supplies a motor driving signal to the motor 14 for moving the optical card 11 under the control of a control circuit 17 to effect the scanning. The control circuit 17 also controls the operation of a laser driving circuit 21 which drives a laser diode 20 provided in a pick-up 19.

The construction of the pick-up 19 is same as the known pick-up for recording and/or reproducing the information on and/or from the optical card. That is to say, the pick-up 19 comprises the laser diode 20 which emits a laser light beam for effecting the recording and reproducing, beam splitter 18 for reflecting the light beam emitted by the laser diode 20, objective lens 22 for focusing the light beam reflected by the beam splitter 18 onto the optical card 11, tracking coil 23 for moving the objective lens 22 in a tracking direction $b_1$ or $b_2$ which is substantially perpendicular to the track direction, and a photodetector 24 for receiving the light beam reflected by the optical card 11 and transmitted through the beam splitter 18. As will be explained later, in the present embodiment a so-called three beam system is utilized. That is to say, a main light beam and two sub light beams are simultaneously projected onto the optical card 11. Then by suitably processing an output signal from the photodetector 24, it is possible to generate a total light amount signal for reading the information recorded on the optical card and a tracking error signal which represents a deviation of the light spot in the tracking direction with respect to the track.

The pick-up 19 is placed on a head carriage 25 which is moved in the tracking direction $b_1$ or $b_2$ which is substantially perpendicular to the track direction by means of a voice coil motor (VCM) 25a. To this end, the voice coil motor 25a is connected to a voice coil motor driving circuit 26. The movement of the head carriage 25 is detected by a scale circuit 27 and an output position signal of the scale circuit 27 is supplied to the VCM driving circuit 26.

The output signal of the photodetector 24 is supplied to a pick-up servo circuit 28 as well as to a total light amount detecting circuit 29. The pick-up servo circuit 28 generates the tracking error signal by processing the output signal supplied by the photodetector 24 and supplies a tracking control current to the tracking coil 23 via a switch 30 and the objective lens 22 is moved in the tracking direction such that the tracking error signal becomes zero.

The tracking error signal generated by the pick-up servo circuit 28 and the total light amount signal generated by the total light amount detecting circuit 29 are supplied to a displacement detecting circuit 31. The displacement detecting circuit 31 generates a peak signal which represents the peak of the deviation between the pick-up 19 and the track on the optical card 11 due to the vibration for the optical card which is generated when the the pick-up is moved in the tracking direction. The thus generated peak signal is supplied to a sequence control circuit 32.

The sequence control circuit 32 controls the operation of the voice coil motor 25a by means of the VCM driving circuit 26 and also drives the switch 30 in accordance with the peak signal supplied from the displacement detecting circuit 31. When the switch 30 is closed, the tracking operation is initiated in accordance with the tracking error signal. That is to say, the sequence control circuit 32 supplies a track-on signal to the switch.

Figure 2:
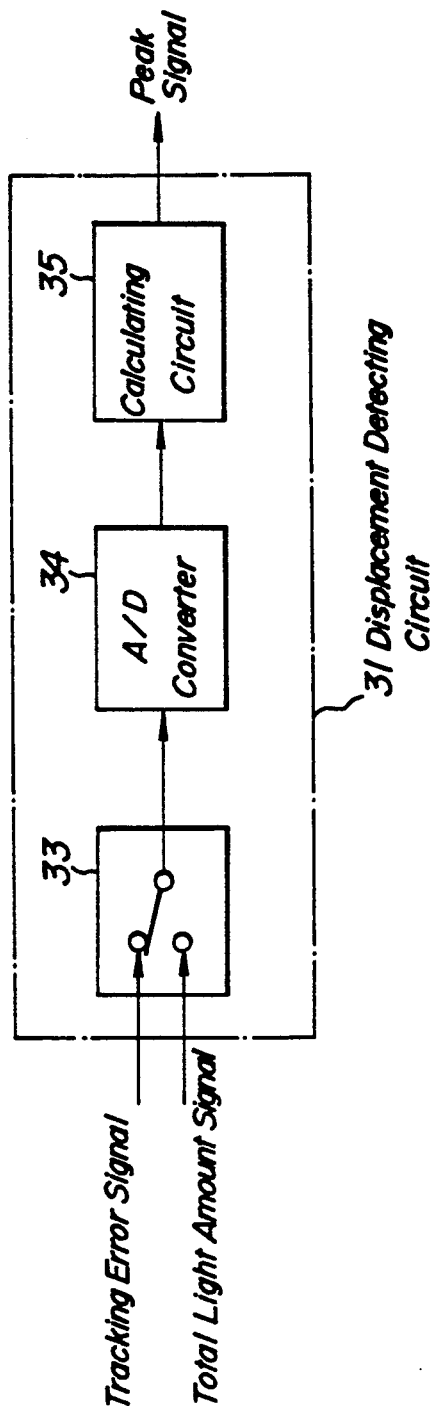
FIG. 2 is a block diagram illustrating the detailed construction of the displacement detecting circuit shown in FIG. 1.

FIG. 2 is a block diagram showing the detailed construction of the displacement detecting circuit 31 shown in FIG. 1. The tracking error signal and total light amount signal are supplied to an analog switch 33 and are separated thereby in the time division mode. An output signal of the analog switch 33 is supplied to an A/D converter 34 and is converted thereby into a digital signal. Then the digital signal is supplied to a calculating circuit 35, in which the tracking error signal and total light amount signal are processed to detect said peak in the displacement.

Figure 3:
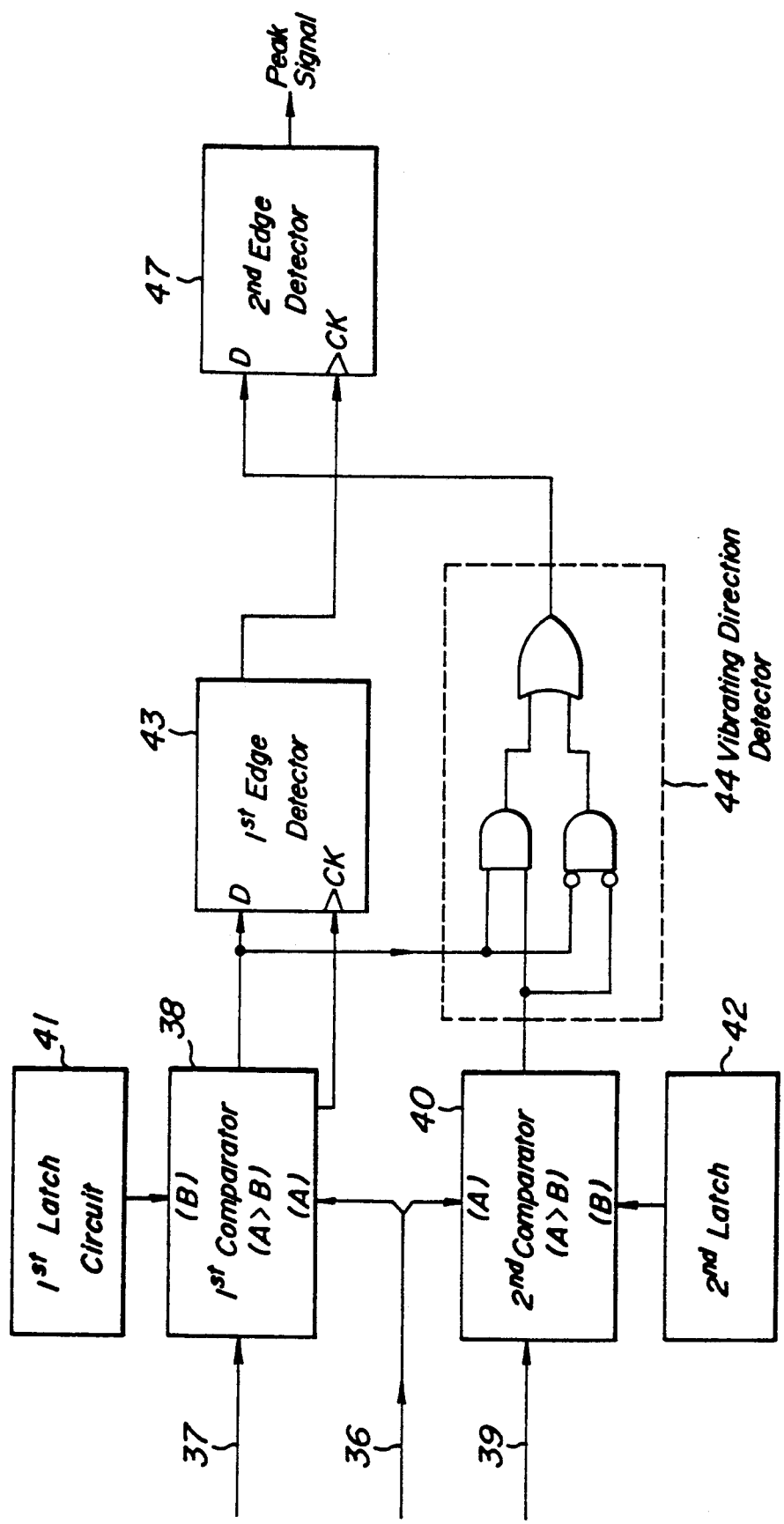
FIG. 3 is a block diagram depicting the detailed construction of the calculating circuit shown in FIG. 2.

FIG. 3 is a block diagram showing the detailed construction of the calculating circuit 35 illustrated in FIG. 2. The digital signal is supplied from the A/D converter 34 via 8 bit data line 36 to A input terminals of first and second comparators 38 and 40, to which are also supplied from the A/D converter start signals via control lines 37 and 39, respectively. That is to say, when the A/D converter 34 supplies the digitalized tracking error signal the start signal appears on the control line 37 and only the first comparator 38 is actuated, and when the digitalized total light amount signal is supplied from the A/D converter, the start signal is supplied via the control line and only the second comparator 40 is initiated to operate.

The calculating circuit 35 further comprises a first latch 41 for storing 8 bit reference value data which represents a middle level value of the tracking error signal, and a second latch 42 for storing 8 bit reference value data which denotes a middle level value of the total light amount signal. These data signals are supplied to B input terminals of the first and second comparators 38 and 40, respectively.

When the A/D converter 34 supplies the digitalized tracking error signal, the first comparator 38 compares the tracking error signal supplied to its A input terminal and the reference value data supplied to its B input terminal. When the tracking error signal is higher than the reference value data (A>B), the first comparator 38 generates a high level signal which is supplied t first edge detecting circuit 43 and vibrating direction detecting circuit 44. After the comparison operation has been finished and the output signal has been set, the first comparator 38 supplies a positive pulse to CK input terminal of the first edge detecting circuit 43.

Figure 4:
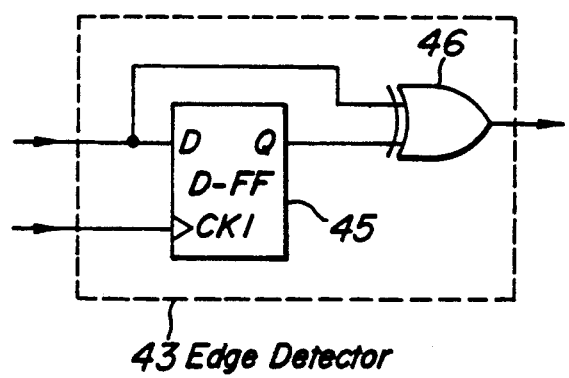
FIG. 4 is a circuit diagram representing the detailed construction of the edge detecting circuit illustrated in FIG. 3.

FIG. 4 is a circuit diagram showing the detailed construction of the first edge detecting circuit 43. The first edge detecting circuit 43 comprises a D flip-flop (D-FF) 45 and an exclusive OR circuit 46. The first edge detecting circuit 43 generates a positive pulse when the signal supplied to D input terminal at a rising edge of the pulse signal supplied to the CK input terminal differs from that of a previous operation cycle. That is to say, when the tracking error signal passes the middle level (rising point C and trailing point C' in FIG. 6), the first edge detecting circuit 43 generates the positive pulse signal.

The second comparator 40 compares the total light amount signal with its middle level and generates a high level signal when the total light amount signal is larger than its middle level (A>B). The thus generated signal is supplied to the vibrating direction detecting circuit 44, to which is also supplied the output signal of the first comparator 38. Then, the vibrating direction detecting circuit 44 generates a high level signal when the vibrating direction at the time that the tracking error signal crosses its middle level is identical with the direction $b_1$ in FIG. 1. It should be noted that the vibrating direction detecting circuit 44 generates the output signal during a time other than said timing, but this output signal is blocked by a second edge detecting circuit 47.

The second edge detecting circuit 47 has the same construction as that of the first edge detecting circuit 43. To D input terminal of D-FF is supplied the vibrating direction denoting signal from the vibrating direction detecting circuit 44 and to CK input terminal is supplied the timing signal which is generated by the first edge detecting circuit 43 when the tracking error signal crosses its middle level. That is to say, the second edge detecting circuit 47 generates a positive pulse when the vibrating direction is changed at the point C or C'. In this manner the peak point (point e in FIG. 7) of the displacement is detected.

As explained above, the tracking error signal and total light amount signal are alternately converted into the digital signals by the A/D converter 34 in accordance with a predetermined cycle. A period of this cycle is determined such that the points C, C' and e can be detected correctly with respect to the variation of the tracking error signal and total light amount signal.

Now the operation of the present embodiment will be explained.

At the initiation of the seek operation, a distance between a current track on which the light spot is made incident and a desired track on which the light spot is to be made incident next is derived. Then, the pick-up 19 is moved over the thus derived distance by driving VCM 25a of the head carriage 25 by means of the VCM driving circuit 26 in accordance with the position pulses supplied by the scale circuit 27. Now for a time being, it is assumed that that the optical card 11 is not vibrated with respect to the pick-up 19. After the head carriage 25 has been moved over the desired distance, the pick-up 19 is positioned such that the focused light spot is made incident upon the desired track. Then, the switch 30 is closed to initiate the track-on operation. After the tracking control has been effected such that the light spot follows the desired track, the optical card 11 is moved in the track direction $a_1$ or $a_2$ by means of the motor 14 and a track address of the relevant track is read out. Then, the thus read out track address is compared with a track address of the desired track and when these track addresses become identical with each other, the seek operation is finished.

In practice, it has been found that during the seek operation the optical card is vibrated due to the acceleration and deceleration of the head carriage, so that the light spot might be made incident upon a track which is different from the desired track. Then, it is necessary to effect the track jump, and the access time is liable to become longer.

In the present embodiment, the light spot can be made incident upon the desired track by detecting the positional relation between the light spot and the track by processing the total light amount signal and tracking error signal and by determining a timing at which the tracking operation on the basis of the thus detected positional relation.

Now the seek operation of the present embodiment will be explained with reference to FIGS. 5 to 7.

Figure 5:
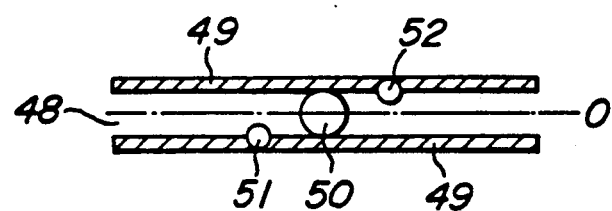
FIG. 5 is a schematic plan view showing the positional relation between the main and sub light spots and the track.

FIG. 5 is a schematic plan view showing the relation of light spots and the track. In the present embodiment, between successive data tracks 48 there is provided a guide track 49. That is to say, the guide tracks 49 are arranged on both sides of the data track 48. A main light spot 50 is made incident upon the data track 48 and two sub light spots 51 and 52 are made incident upon the guide tracks. The total light amount signal is obtained by receiving the reflected light of the main light spot 50 and the tracking error signal is derived by detecting a difference between the reflected light beams of the sub light spots 51 and 52. A chain line O represents a center line of the data track 48, and the tracking error signal represents a deviation of a center point of the main light spot 50 with respect to the center line O. It should be noted that when the center point of the main light spot 50 is aligned with the center line O, the total light amount signal becomes maximum.

FIGS. 6A to 6D illustrate waveforms of the total light amount signal and tracking error signal after the pick-up 19 has been moved over the desired distance and has been stopped. It should be noted that the pick-up 19 has been stopped at such a position that if the optical card 11 is not vibrated, the light spot is made incident upon the center line O of the main desired track. In practice, the optical card 11 is vibrated with respect to the pick-up 19, so that the total light amount signal and tracking error signal are periodically changed in accordance with the period of the vibration of the optical card 11. When the optical card 11 moves in the direction $b_1$ in FIG. 1, the phase of the total light amount signal is delayed with respect to the phase of the tracking error signal as shown in FIGS. 6A and 6B. When the optical card 11 moves in the direction $b_2$, the phase of the total light amount signal is advanced with respect to the phase of the tracking error signal as shown in FIGS. 6C and 6D.

The direction of the vibration of the optical card 11 is detected by comparing the signal level of the total light amount signal at the timings C and C' at which the tracking error signal crosses its middle level in the raising direction and trailing direction. When the optical card 11 moves in the direction $b_1$, the level of the total light amount signal at the raising point C is higher than that at the trailing point C', but when the optical card moves in the direction $b_2$, the level of the total light amount signal at the raising point C is lower than that at the trailing point C'. Therefore, the peak point of the vibration of the optical card can be detected as a point at which the phase relation between the total light amount signal and the tracking error signal is inverted. In this manner, the displacement detecting circuit 31 detects the peak point of the vibration of the optical card 11 and supplies the peak signal to the sequence control circuit 32. Further, the period of the vibration can be detected by detecting a time period of successive peak points.

Figure 7:
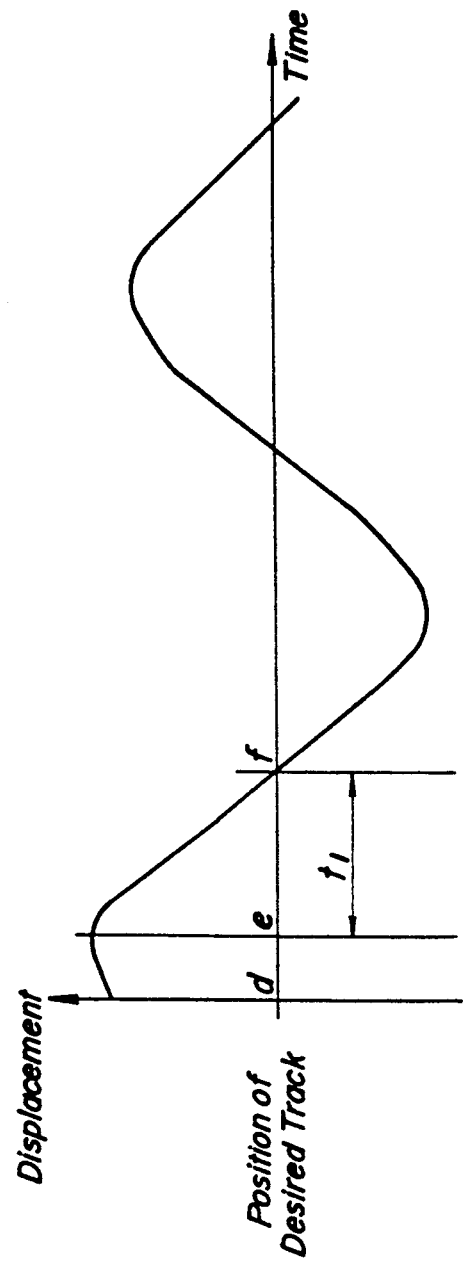
FIG. 7 is a graph depicting the variation in the positional deviation of the light spot with respect to the desired track.

FIG. 7 is a graph showing the relation between the positional variation of the light spot with respect to the track after the movement of the pick-up 19 during the seek operation and the track-on. The vertical axis denotes the position of the desired track viewed from the pick-up 19, i.e. the displacement of the desired track from the light spot, and the horizontal axis represents the elapsing time. It should be noted that at the end of the movement of the pick-up 19, the optical card 11 is vibrated such that the desired track moves reciprocally with respect to the light spot.

At an instant d the movement of the pick-up 19 is stopped, and then at an instant e, the displacement, i.e. the deviation between the light spot and the desired track becomes its peak value. As explained above, this timing e can be determined by the peak signal which is generated in the displacement detecting circuit 31 by monitoring the total light amount signal supplied from the total light amount detecting circuit 29 and the tracking error signal supplied from the pick-up servo circuit 28 and by detecting a timing at which the movement of the optical card 11 is changed from $b_1$ to $b_2$ or from $b_2$ to $b_1$.

When the sequence control circuit 32 received the peak signal supplied from the displacement detecting circuit 31, it generates a track-on signal at a timing f which is separated by a time period $t_1$ from the instant e, said time period $t_1$ being equal to a ¼ of a period of the vibration which has been previously detected. In response to the track-on signal generated by the sequence control circuit 32, the switch 30 is closed to initiate the tracking control. As illustrated in FIG. 7, at the instant f, the deviation of the light spot with respect to the desired track becomes zero, so that the light spot is made incident upon the desired track by the tracking control.

Figure 8:
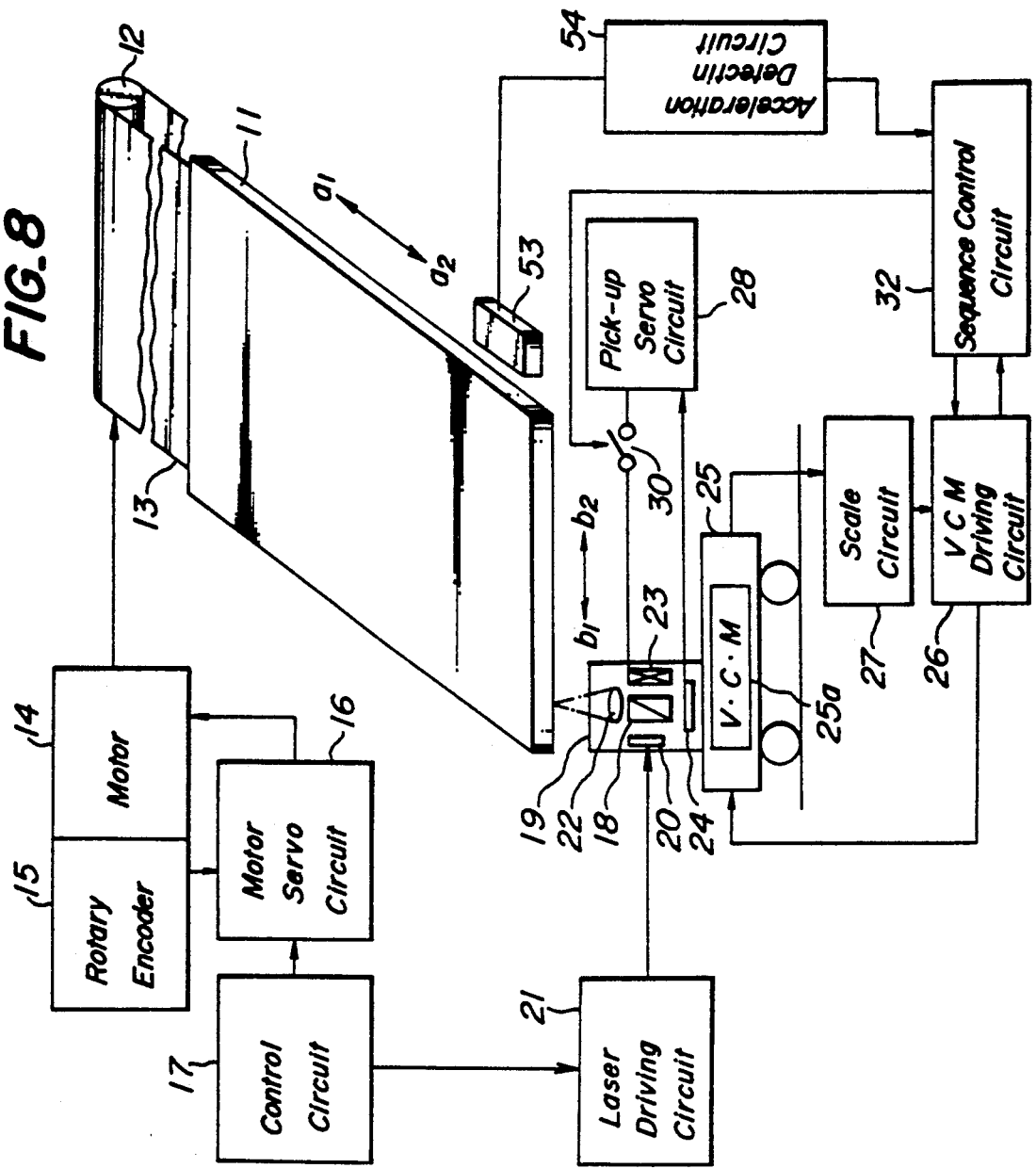
FIG. 8 is a block diagram showing a second embodiment of the information recording and/or reproducing apparatus according to the invention.

FIG. 8 shows a second embodiment of the information recording and/or reproducing apparatus according to the invention. In the present embodiment, portions similar to those of the first embodiment are denoted by the same reference numerals used in the first embodiment and their explanation is dispensed with.

Figure 9:
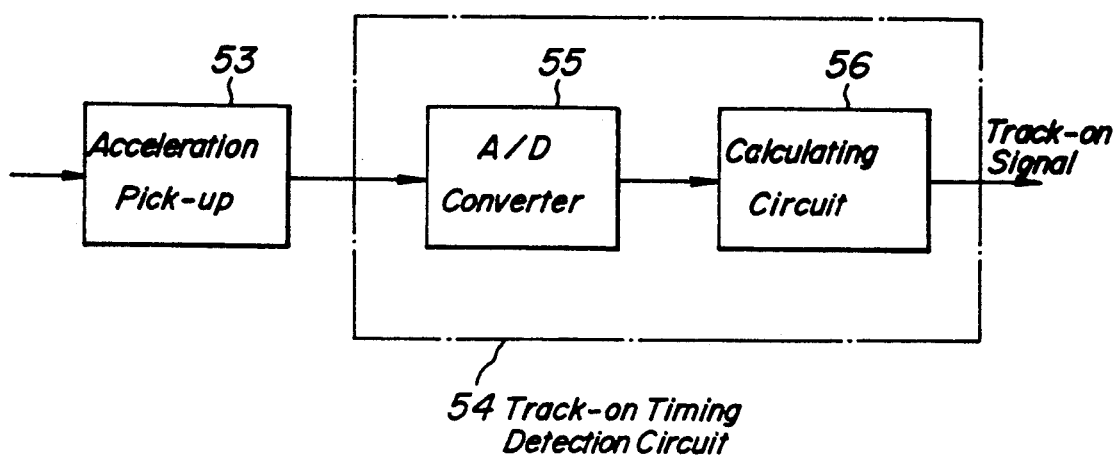
FIG. 9 is a block diagram illustrating the detailed construction of the acceleration detecting circuit shown in FIG. 8.

In the present embodiment, an acceleration pick-up 53 is provided on the shuttle for carrying the optical card and an acceleration signal generated by the acceleration pick-up 53 is supplied to a track-on timing detection circuit 53 for detecting the track-on timing of the light spot with respect to the desired track. As depicted in FIG. 9, the acceleration signal generated by the acceleration pick-up 53 is supplied to an A/D converter 55 and a digitalized acceleration signal is supplied to a calculating circuit 56.

As shown in FIG. 7, the acceleration of the optical card 11 after the movement of the pick-up 19 becomes maximum at the time instant e and becomes zero at the time instant f. Therefore, the calculating circuit 56 detects the timing at which the acceleration becomes zero, it is possible to detect the track-on timing at which the light spot is made incident upon the desired track. The thus detected track-on timing signal is supplied to the sequence control circuit 32.

When the track-on timing signal is supplied from the track-on timing detection circuit 54 to the sequence control circuit 32, the sequence control signal supplies the track-on signal and the switch 30 is closed to initiate the tracking control, and the light spot can be made incident on the desired track. In this manner the access time can be shortened.

Figure 10:
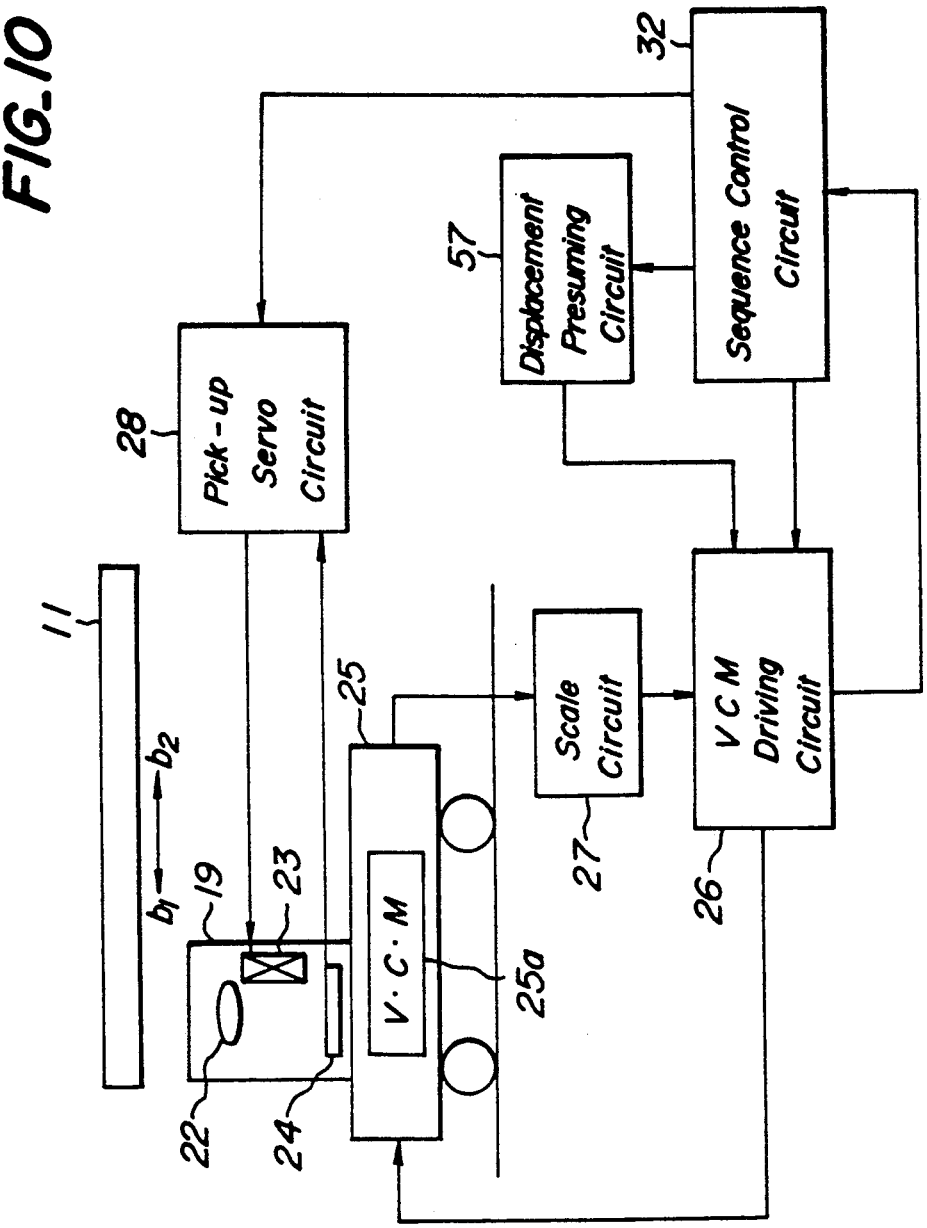
FIG. 10 is a block diagram representing a third embodiment of the information recording and/or reproducing apparatus according to the invention.

FIG. 10 depicts a third embodiment of the information recording and/or reproducing apparatus according to the invention. Also in this embodiment, portions similar to those of the previous embodiments are denoted by the same reference numerals used in the previous embodiments and their explanation is omitted.

In the present embodiment, there is provided a displacement presuming or estimating circuit 57 between the VCM driving circuit 26 and the sequence control circuit 32. Before moving the pick-up 19 the sequence control circuit 32 supplies position data including current position and desired position of the pick-up to the VCM driving circuit 26 as well as to the displacement presuming circuit 57. The displacement presuming circuit 57 derives a displacement amount on the basis of the position data and supplies a correction signal to the VCM driving circuit 26.

As explained above, the optical card 11 is vibrated during the movement of the pick-up 19 due to the acceleration and deceleration. The inventor has experimentally found that the same vibration occurs when the acceleration and deceleration pattern of the pick-up 19 is same and that the acceleration and deceleration pattern is predominantly determined by the current position of the pick-up 19 and the position of the desired track. Therefore, when the current position of the pick-up and the position of the desired track are determined, it is possible to presume the acceleration and deceleration pattern. In the present embodiment, the displacement of the light spot with respect to the desired track at the end of the movement of the pick-up 19 is presumed by the displacement presuming circuit 57 on the basis of the position data supplied from the sequence control circuit 32. To this end, the displacement presuming circuit 57 comprises a memory such as EEPROM in which a displacement table is stored.

FIG. 11 illustrates the displacement table stored in the displacement presuming circuit 57. The horizontal axis shows current positions of the pick-up 19 and the vertical axis denotes desired tracks onto which the pick-up is to be moved next. For instance, when the current position of the pick-up 19 is 100H and the desired track onto which the pick-up is to be moved next is 0H. Then, the sequence control circuit 32 supplies the position data including these positions 100H and 0H to the displacement detecting circuit 57. In the displacement detecting circuit 57 a correction value of −1 is read out of the displacement table and then the thus detected correction value is supplied to the VCM driving circuit 26. To the VCM driving circuit 26 is also supplied from the sequence control circuit 32 the position data representing the current position of 100H and the desired track position of 0H, so that the VCM driving circuit drives the VCM 25a such that the pick-up 19 is moved over a distance of −101H.

After the VCM 25a has been driven and the pick-up has been stopped, the VCM driving circuit 26 supplies a movement completion signal to the sequence control circuit 32, and then the sequence control circuit supplies the track-on signal to the pick-up servo circuit 28 to initiate the tracking control. At a timing when the movement of the pick-up 19 has been stopped, the desired track is deviated from the light spot center in a given direction denoted by the polarity of the correction signal over a distance represented by an absolute value of the correction signal, and therefore the distance of the movement of the pick-up 19 is corrected in accordance with the correction signal, the light spot is just made incident upon the desired track when the movement of the pick-up 19 is stopped. Therefore, in the present embodiment, the track-on can be attained by initiating the tracking control a soon as the movement of the pick-up is stopped. In this manner, the access time can be shortened. It should be noted that the deviation table can be renewed every time the seek operation has been performed in accordance with the result of each seek operation.

The present invention is not limited to the embodiments explained above, but many alternations and modifications may be conceived by those who are skilled in the art within the scope of the invention. In the above embodiments, the optical card is used as the optical record medium, but other optical record medium such as the optical disk and opto-magnetic disk may be used.

As explained above in detail, according to the invention the tracking operation can be initiated when the light spot is made incident upon the desired track even if the optical record medium is vibrated with respect to the pick-up, and therefore the track-on operation can be performed precisely and the access time can be shortened. Particularly, in the information recording and/or reproducing apparatus using the optical card, during the seek operation there is no movement of the optical card except for the above mentioned vibration, it is possible to perform the seek operation effectively.

What is claimed is:

1. An apparatus for recording and reproducing information on and from an optical record medium, comprising:
   a pick-up means for projecting a light spot onto an optical record medium to record and reproduce information on and/or from the optical record medium, said information being recorded along a plurality of tracks provided on said optical record medium;
   a head carriage means for moving said pick-up means in a seek direction which is substantially perpendicular to a track direction in which said tracks are aligned;
   a scanning means for moving the optical record medium with respect to the light spot in said track direction to effect the recording and reproducing;
   a tracking means for performing a tracking operation by positioning said light spot onto a track while said scanning means moves the optical record medium with respect to the light spot in the track direction;
   a seek means for effecting a seek operation by driving said head carriage to move said pick-up means in the seek direction over a distance between a current track on which the light spot is currently made incident and a desired track on which the light spot is to be made incident next; and
   a control means for determining a timing at which said light spot is made incident on said desired track after the pick-up means has been moved over said distance during the seek operation and for causing said tracking means to initiate the tracking operation in response to said timing,
   wherein said control means determines said timing by detecting peak points of vibration of the optical record medium with respect to the pick-up means and generates a track-on signal, indicating said timing, which is separated from one of said peak points by a predetermined time period, and said tracking means initiates the tracking operation in response to said track-on signal.

2. An apparatus according to claim 1, wherein said timing at which said control means causes said tracking means to initiate said tracking operation is determined to coincide with a presumed timing at which said light spot is expected to be made incident upon the desired track.

3. An apparatus according to claim 2, wherein said distance over which said pick-up means is to be moved from the current track to the desired track during the seek operation is changed by a correction amount which is presumed in accordance with position data of the current track and the desired track and which has a magnitude such that the light spot is made incident upon the desired track when movement of the pick-up means is stopped.

4. An apparatus according to claim 3, wherein said control means further comprises a sequence control circuit for generating the position data of the current track and the desired track, and a displacement presuming circuit for storing a displacement table which denotes correction amounts for all possible position data and for deriving a correction amount in accordance with the position data received from said sequence control circuit.

5. An apparatus according to claim 1, wherein said track-on signal is generated at a timing which is separated from the peak point of the vibration of the optical record medium by $\frac{1}{4}$ of a period of the vibration of the optical record medium.

6. An apparatus according to claim 5, wherein said means for detecting comprises a displacement detecting circuit means for detecting said peak points of the vibration of the optical record medium to produce a peak signal, said means for generating comprises a frequency control circuit for generating the track-on signal in response to said peak signal, and said control means further comprises a switch connected to the tracking means, said switch being closed in response to said track-on signal to cause said tracking means to initiate the tracking control.

7. An apparatus according to claim 6, wherein said pick-up means comprises a detector means for providing a total light amount signal indicating an amount of light reflected from said optical record medium when said light spot is projected onto said optical record medium, said apparatus further comprises means for generating a tracking error signal and said displacement circuit means detects said peak points by determining a timing at which a phase difference between said tracking error signal and said total light amount signal is inverted.

8. An apparatus according to claim 6, wherein said pick-up means comprises a detector means for providing a total light amount signal indicating an amount of light reflected from said optical record medium when said light spot is projected onto said optical record medium, said apparatus further comprises means for generating a tracking error signal and said displacement detecting circuit means comprises:
- an analog switch which alternatively receives the tracking error signal in analog form and said total light amount signal in analog form,
- an A/D converter for converting the analog tracking error signal and the analog total light amount signal into a digital tracking error signal and a digital total light amount signal,
- a first comparator for generating a first logic signal whose level is changed when the digital tracking error signal crosses its middle level, a second comparator for generating a second logic signal when the digital total light amount signal crosses its middle level,
- a first edge detecting circuit for receiving the first logic signal and generating a third logic signal when the level of said first logic signal is changed,
- a vibrating direction detecting circuit for generating a direction signal denoting the direction of the vibration of the optical record medium by processing said first and second logic signals, and
- a second edge detecting circuit for generating a peak signal in accordance with said third logic signal and said direction signal.

9. An apparatus according to claim 1, further comprising means for detecting a timing at which said light spot is made incident upon the desired track wherein said control means causes said tracking means to initiate said tracking operation at said timing.

10. An apparatus for recording and reproducing information on and from an optical record medium, comprising:
- a pick-up means for projecting a light spot onto an optical record medium to record and reproduce information on and/or from the optical record medium, said information being recorded along a plurality of tracks provided on said optical record medium;
- a head carriage means for moving said pick-up means in a seek direction which is substantially perpendicular to a track direction in which said tracks are aligned;
- a scanning means for moving the optical record medium with respect to the light spot in said track direction to effect the recording and reproducing;
- a tracking means for performing a tracking operation by positioning said light spot onto a track while said scanning means moves the optical record medium with respect to the light spot in the track direction;
- a seek means for effecting a seek operation by driving said head carriage to move said pick-up means in the seek direction over a distance between a current track on which the light spot is currently made incident and a desired track on which the light spot is to be made incident next; and
- a control means for determining a timing at which said light spot is made incident on said desired track after the pick-up means has been moved over said distance during the seek operation and for causing said tracking means to initiate the tracking operation in response to said timing,
wherein said control means determines said timing by detecting a variation in an acceleration of a vibration of the optical record medium with respect to the pick-up means and generates a track-on signal, indicating said timing, when the acceleration becomes zero, and wherein said tracking means initiates said tracking operation in response to said track-on signal.

11. An apparatus for recording and reproducing information on and from an optical record medium, comprising:
- a pick-up means for projecting a light spot onto an optical record medium to record and reproduce information on and/or from the optical record medium, said information being recorded along a plurality of tracks provided on said optical record medium;
- a head carriage means for moving said pick-up means in a seek direction which is substantially perpendicular to a track direction in which said tracks are aligned;
- a scanning means for moving the optical record medium with respect to the light spot in said track direction to effect the recording and reproducing;
- a tracking means for performing a tracking operation by positioning said light spot onto a track while said scanning means moves the optical record medium with respect to the light spot in the track direction;

a seek means for effecting a seek operation by driving said head carriage to move said pick-up means in the seek direction over a distance between a current track on which the light spot is currently made incident and a desired track on which the light spot is to be made incident next; and a control means for determining a timing at which said light spot is made incident on said desired track after the pick-up means has been moved over said distance during the seek operation and for causing said tracking means to initiate the tracking operation in response to said timing, wherein said control means comprises an acceleration pick-up for determining said timing by detecting an acceleration of a vibration of the optical record medium, a displacement detecting circuit for generating a track-on signal, indicating said timing, when the acceleration becomes zero, a sequence control circuit for generating a tracking start signal in response to the track-on signal, and a switch connected to the tracking control means, said switch being closed by said tracking start signal to cause said tracking means to initiate the tracking operation.

12. An apparatus for recording and reproducing information on and from an optical record medium, comprising:

a pick-up means for projecting a light spot onto an optical record medium to record and reproduce information on and/or from the optical record medium, said information being recorded along a plurality of tracks provided on said optical record medium;

a head carriage means for moving said pick-up means in a seek direction which is substantially perpendicular to a track direction in which said tracks are aligned;

a scanning means for moving the optical record medium with respect to the light spot in said track direction to effect the recording and reproducing;

a tracking means for performing a tracking operation by positioning said light spot onto a track while said scanning means moves the optical record medium with respect to the light spot in the track direction;

a seek means for effecting a seek operation by driving said head carriage to move said pick-up means in the seek direction over a distance between a current track on which the light spot is currently made incident and a desired track on which the light spot is to be made incident next; and a control means for detecting mechanical vibration of said optical recording medium with respect to said pick-up means, for generating a signal representing said vibration, and for generating a track-on signal at a predetermined timing relative to a signal characteristic of said signal representing said mechanical vibration to cause said tracking means to initiate the tracking operation substantially immediately when said light spot is made incident on said desired track after the pick-up means has been moved over said distance during the seek operation.

* * * * *